Aug. 27, 1957 C. R. YUNKER 2,804,158
HYDRAULIC STEERING FOR FOUR WHEELS OF A SIX WHEELED VEHICLE
Filed July 19, 1954 2 Sheets-Sheet 1

Aug. 27, 1957     C. R. YUNKER     2,804,158
HYDRAULIC STEERING FOR FOUR WHEELS OF A SIX WHEELED VEHICLE
Filed July 19, 1954     2 Sheets-Sheet 2

2,804,158

HYDRAULIC STEERING FOR FOUR WHEELS OF A SIX WHEELED VEHICLE

Clarence Roy Yunker, Wheeler, Oreg.

Application July 19, 1954, Serial No. 444,095

3 Claims. (Cl. 180—79.2)

This invention relates to motor vehicles and more especially to motor trucks of the type that employ front and dual rear axle drives and multiple driving wheels.

The invention is particularly concerned with steering mechanism for such vehicles.

It is one of the primary objects of the present invention to provide steering mechanism which will turn the front and rearmost wheels of the vehicle so that lines perpendicular thereto will intersect at a common focal point on a line perpendicular to the rear wheels. In this manner improved and sharper turning action results and tire slippage is substantially eliminated.

With the foregoing and other objects in view, it will become apparent as the description proceeds that the invention consists essentially in the novel combination and arrangement of parts hereinafter described in detail and illustrated in the accompanying drawings in which.

Figure 1:
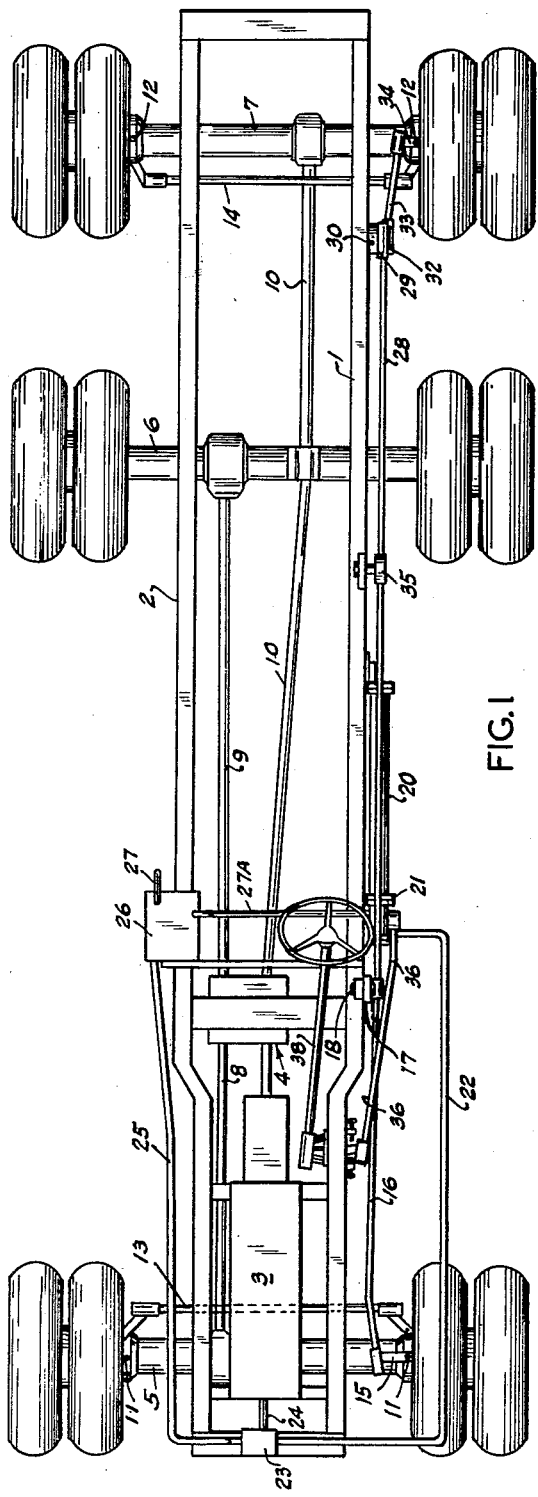
Figure 1 is a top plan view of a truck chassis equipped with steering mechanism made in accordance with my invention.

Referring now more particularly to the drawings:

The chassis of the truck is of more or less conventional design including longitudinal frame members indicated by reference numerals 1 and 2, an engine 3 connected to power transmission means 4, and power-driven front, rear and rearmost axles 5, 6 and 7, respectively, operatively connected to the power transmission means by drive shafts 8, 9 and 10, respectively. Each axle is preferably provided with dual traction wheels at both of its ends as shown.

The axle shafts of the front and rearmost axles 5 and 7 are pivotally attached as at 11 and 12, respectively, to their respective axles. The front axle shafts are interconnected by a tie rod 13 and the rearmost axle shafts by a tie rod 14. The steering arm 15 of one front axle shaft is connected to one end of a link 16 whose opposite end is pivotally connected to the bottom end of an arm 17 swingably attached as at 18 to the longitudinal chassis member 1. Also connected to this end of the link or to the arm 17 is one end of a connecting rod 19 whose opposite end is provided with a piston (not shown) operatively disposed within a two-way hydraulic power steering booster cylinder 20 pivotally attached to the frame member 1 as at 20A and controlled by a valve 21 connected by a pressure supply line 22 to one side of a pressure pump 23 mounted upon the forward end of the chassis and driven by the engine shaft 24. The other side of the pump is connected by a fluid supply line 25 to a supply tank 26 mounted in any convenient location on the chassis and vented to the atmosphere through a stand-pipe 27. A fluid return line 27A connects the valve 21 with the supply tank.

Also pivotally attached to the arm 17 is one end of a rod 28 whose opposite end is pivotally connected as at 29 to the top end of a rocker arm 30 which is pivotally attached as at 31 to the chassis frame member 1. The bottom end of the rocker arm is pivotally connected at 32 to a link 33 which is connected at its opposite end to the steering arm 34 of one axle shaft of the rearmost axle 7. The rod 28 is stabilized against deflection intermediate its ends between a pair of rollers 35 attached in any approved manner to the chassis frame member.

The valve 21 is controlled by an actuating rod 36 connected at one of its ends to the valve and at its opposite end to the pitman arm 37 connected in the conventional manner to and operated by the steering column 38. Movement of the pitman arm in an arcuate path is limited by adjustable stops 39 carried by the chassis frame member 1.

Figure 2:
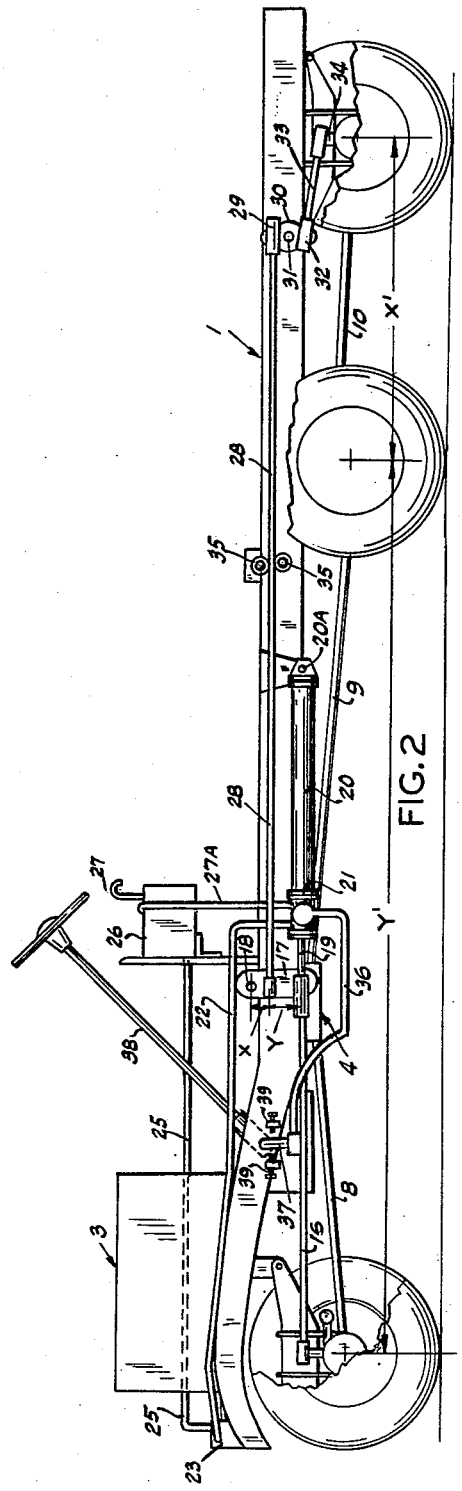
Figure 2 is a side view of Figure 1 with fragments broken away for convenience of illustration.
Figure 3:
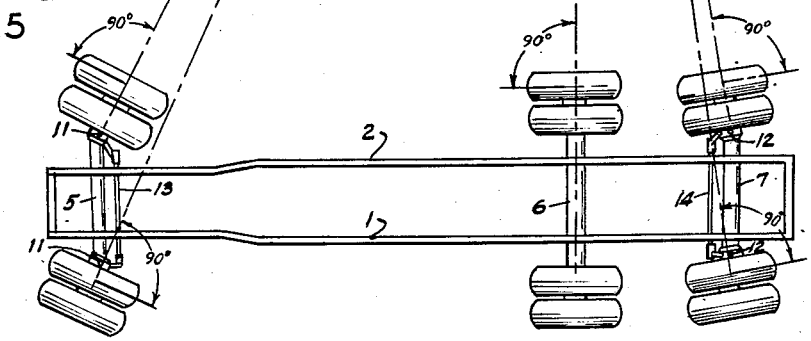
Figure 3 is a diagrammatic plan view of the truck chassis illustrating the general steering requirements for the present invention.

It will be noted in Figure 3 that lines perpendicular to the steerable wheels intersect a common focal point on a line "A" at any point in the turning circle and that the location of the focal point in respect to the longitudinal centerline of the truck is variable directly with the radius of turn. This is accomplished by the ratio X:Y (arm 17)::X':Y' (wheel centers) as shown in Figure 2. By this arrangement greater maneuverability and improved and sharper turning action results and the tires are subject to less wear since slipping thereof is substantially eliminated. Another advantage is that the steering mechanism may be actuated by lower loads during steering maneuvers.

Figure 4:
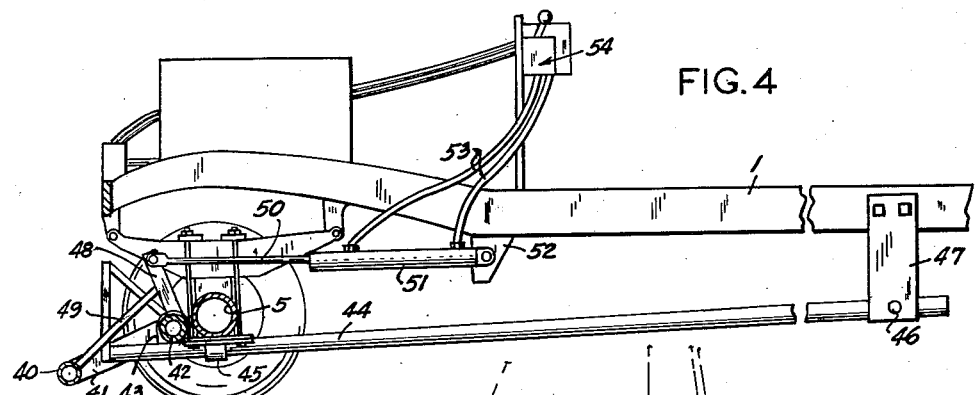
Figure 4 is a fragmentary side view of the forward portion of the chassis showing a lifting mechanism applied thereto in accordance with my invention.
Figure 5:
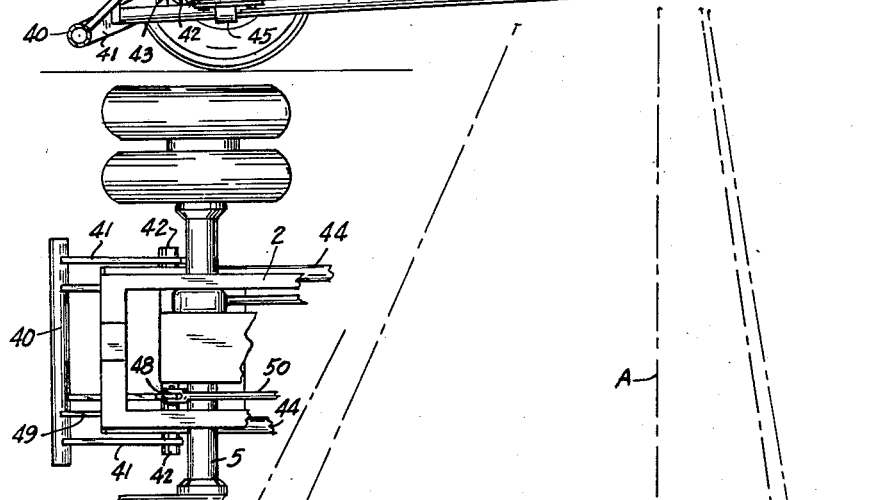
Figure 5 is a fragmentary top plan view of Figure 4.

The invention is thus particularly well adapted for use as a towing vehicle for various types of farm machinery and the like and more especially for use as a "pusher" and partial support for ensilage cutters or shredders of the type shown and described in my co-pending application, wherein spaced apart hook members at the rear end of the cutter engage with a horizontally disposed lifting bar 40 swingably mounted at the forward end of the truck (see Figure 4) for movement in a vertical plane. The lifting mechanism comprises the bar 40 secured to the forward end of a pair of parallel arms 41 whose opposite ends are secured to a shaft 42 rotatably mounted in bearings 43 mounted upon a pair of supporting rods 44 which are secured near their forward ends as at 45 to the front axle housing 5 of the truck and pivotally attached at their rear ends at 46 to plates 47 secured to and depending from the frame members 1 and 2 of the truck chassis. An actuating arm 48 is secured at one of its ends to the shaft 42 and intermediate its ends to the lifting bar by a diagonal member 49. The top end of the actuating arm is pivotally connected to the outer end of a connecting rod 50 whose opposite end is provided with a piston (not shown) operatively disposed within a two-way hydraulic cylinder 51 pivotally attached at its rear end to a plate 52 secured to and depending from the frame member 1. The cylinder is connected as at 53 to and controlled by any approved type of manually actuated two-way valve generally indicated at 54 for directing and exhausting fluid pressure to and from the interior of the cylinder to respectively raise and lower the lifting bar and a load carried by it. The load thus applied to the forward steerable wheels provides them with traction to drive and steer the truck independent of that provided by the rear and rearmost wheels which at times might not be sufficient if the truck body is empty or lightly loaded or if the truck is being operated in a muddy or slippery field.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

1. A power driven vehicle having a frame supported at its forward end and at its rearmost end by steerable traction wheels and near its rear end by non-steerable traction wheels, said steerable wheels being mounted upon axle shafts, said axle shafts being connected to a common actuating arm connected to and operable by an hydraulic power steering booster cylinder carried by said frame, an engine mounted upon the frame, a horizontally disposed lifting bar swingably mounted at the forward end of the frame for movement in a vertical plane, hydraulic pressure actuated means carried by the frame and connected to said lifting bar for raising and lowering the same, a pump driven by said engine for delivering fluid pressure through control valves to said steering booster cylinder and to said hydraulic means, whereby a load carried by the lifting bar will provide said forward steerable wheels with traction for propelling and steering the vehicle independent of that provided by said rear and rearmost wheels.

2. A power driven vehicle comprising a frame supporting an engine and a steering column at its forward end, front and rear axles transversely connected to the front and rear ends of the frame, an intermediate axle transversely connected to the frame adjacent its rear end, means operatively connecting the axles to the engine, steerable axle shafts supporting traction wheels on the ends of the front and rear axles, tie rods connecting the axle shafts of each axle, non-steerable traction wheels mounted on the intermediate axle, an actuating arm depending from the frame and pivoted adjacent its upper end to the frame rearwardly of the front axle for vertical swinging movement about an axis transverse to the frame, a link pivotally connected at one end to one of the axle shafts on the front axle and pivotally connected at its other end to the lower end of the actuating arm, a connecting rod pivotally connected at one end to said actuating arm intermediate the ends of the actuating arm and pivotally connected at its other end to one of the axle shafts of the rear axle, a hydraulic power steering booster cylinder pivotally connected at its closed end to the frame and extending longitudinally thereof and having a piston rod sealingly and slidably extending through its opposite end and pivotally connected to the actuating arm, a pump driven by the engine and supported on the frame for delivering fluid pressure to the cylinder, a valve controlling the flow of fluid pressure to and from the cylinder, and a pitman arm actuated by the steering column in its manually actuated rotative movements for operating said valve to turn said front and rear steerable wheels simultaneously.

3. A power driven vehicle as claimed in claim 2, wherein a hydraulically actuated lift means is swingably mounted at the front end of the frame for movement in a vertical plane and is actuated by the pump through a control valve so that a load carried by the lift means will provide the front steerable wheels with traction for propelling and steering the vehicle independent of that provided by the rear steerable wheels and rear non-steerable wheels.

References Cited in the file of this patent

UNITED STATES PATENTS

| | | |
|---|---|---|
| 915,733 | Brillie | Mar. 23, 1909 |
| 1,291,724 | Bartelt | Jan. 21, 1919 |
| 1,846,089 | Davis | Feb. 23, 1932 |
| 1,977,817 | Bird | Oct. 23, 1934 |
| 2,358,236 | Lee | Sept. 12, 1944 |
| 2,368,741 | Bowling | Feb. 6, 1945 |
| 2,479,427 | Stover | Aug. 16, 1949 |
| 2,612,385 | Piltz | Sept. 30, 1952 |